United States Patent [19]

Hull

[11] 3,858,219
[45] Dec. 31, 1974

[54] FREQUENCY DIVERSITY RADAR

[75] Inventor: Joseph F. Hull, Redwood City, Calif.

[73] Assignee: The United States of America as represented by the Secretary of the Army, Washington, D.C.

[22] Filed: Oct. 10, 1955

[21] Appl. No.: 539,705

[52] U.S. Cl. ...... 343/17.2 R, 343/17.1 R, 343/18 E
[51] Int. Cl. .......................... G01s 7/28, G01s 7/36
[58] Field of Search............. 250/17.912, 17.9, 6.6; 343/17.1, 17.1 R, 17.2 R, 18 E

[56] References Cited
UNITED STATES PATENTS

| | | | |
|---|---|---|---|
| 2,522,367 | 9/1950 | Guanella | 343/17.1 |
| 2,543,448 | 2/1951 | Emslie | 343/7.7 |
| 3,163,862 | 12/1964 | Jenny | 343/17.2 R |
| 3,390,391 | 6/1968 | Kissinger et al. | 343/17.2 R |

Primary Examiner—Maynard R. Wilbur
Assistant Examiner—G. E. Montone
Attorney, Agent, or Firm—Eugene E. Stevens, III; Jack H. Stanley; Frank J. Dynda

EXEMPLARY CLAIM

1. A frequency diversity radar system comprising a source of pulses of recurring frequency, a source of relatively high power radio-frequency energy periodically energized into oscillations by said recurring pulses and adapted to be voltage tuned over a relatively wide range of frequencies, an antenna responsive to the output of said pulsed oscillations, a source of relatively low power continuous-wave radio-frequency energy adapted to be voltage tuned over said range of frequencies, means responsive to said recurring pulses for voltage tuning said radio-frequency energy sources whereby the respective frequency-outputs therefrom are instantaneously and simultaneously shifted to successive discrete frequencies by successive recurring pulses, means coupled between said sources whereby the output frequency of said low power source is maintained constant for the duration between a pair of successive recurring pulses at the frequency of said high power source due to the first of said succesive pair of pulses, a radar receiver adapted to receive echo signals and including local oscillator means for converting said received signals to a prescribed intermediate frequency, and means for heterodyning the successive frequency outputs from said low power source and said intermediate frequency whereby there is produced the local oscillator frequency to convert said received signals to said intermediate frequency.

8 Claims, 2 Drawing Figures

FREQUENCY DIVERSITY RADAR

The invention described herein may be manufactured and used by or for the Government for governmental purposes, without the payment of any royalty thereon.

This invention relates to radar systems and more particularly to frequency diversity radar systems of the pulse echo type.

To overcome the effects of interfering signals such as jamming signals or unintentional signals from other transmitters, it is usually necessary to vary the operating frequency, preferably in a random manner over a wide frequency range. With the advent of voltage tuned magnetrons, frequency diversity systems have been devised which utilize continuous-wave low power magnetrons and a pulsed microwave amplifier chain. The output frequency of the continuous-wave magnetron is shifted in a random manner and applied to the transmitting antenna through the microwave amplifier chain which is adapted to operate over only a relatively short period of time to provide the transmitted pulsed energy. One such system is described in a copending application for a "Frequency Diversity Radar System," Ser. No. 490,702. The inherent limitation of bandwidth in the periodic structures which comprises the pulsed amplifier chain in such systems greatly limits the overall effectiveness of such a system. Another factor which limits the usefulness of such systems is that unless both the amplifying tubes and the system are carefully designed there is an inherent tendency of the amplifier tubes to oscillate parasitically.

It is therefore an object of the present invention to provide an improved frequency diversity radar systems wherein the aforementioned limitations are overcome.

It is another object of the present invention to provide an improved frequency diversity radar system wherein the microwave amplifier chain is completely eliminated.

A further object of the invention is to provide an improved frequency diversity radar system having higher power, higher efficiency and adapted to operate over a much wider frequency range.

In accordance with the present invention there is provided a frequency diversity radar system which includes a source of pulse recurring frequency and a source of relatively high power radio-frequency energy periodically energized into oscillation by the recurring pulses and adapted to be voltage tuned over a relatively wide range of frequencies. Also included is an antenna responsive to the output of the pulsed oscillation and a source of relatively low power continuous-wave radio-frequency energy adapted to be voltage tuned over said range of frequencies. Further included are means responsive to the recurring pulses for voltage tuning both radio-frequency energy sources whereby the respective frequency outputs of these sources are instantaneously and simultaneously shifted to successive discrete frequencies by successive recurring pulses. In addition there are included means coupled between the sources whereby the output frequency of the low power source is maintained constant for the duration between a pair of successive recurring pulses at the frequency of the pulsed frequency source due to the first of the successive pair of pulses. Also included is a radar receiver adapted to receive echo signals and including local oscillator means for converting the received signals to a prescribed intermediate frequency, and means for heterodyning the successive frequency outputs from the low power source and the intermediate frequency whereby there is produced the local oscillator frequency to convert the received signals to the intermediate frequency.

For a better understanding of the invention, together with other and further objects thereof, reference is had to the following description taken in connection with the accompanying drawing in which.

Figure 1:
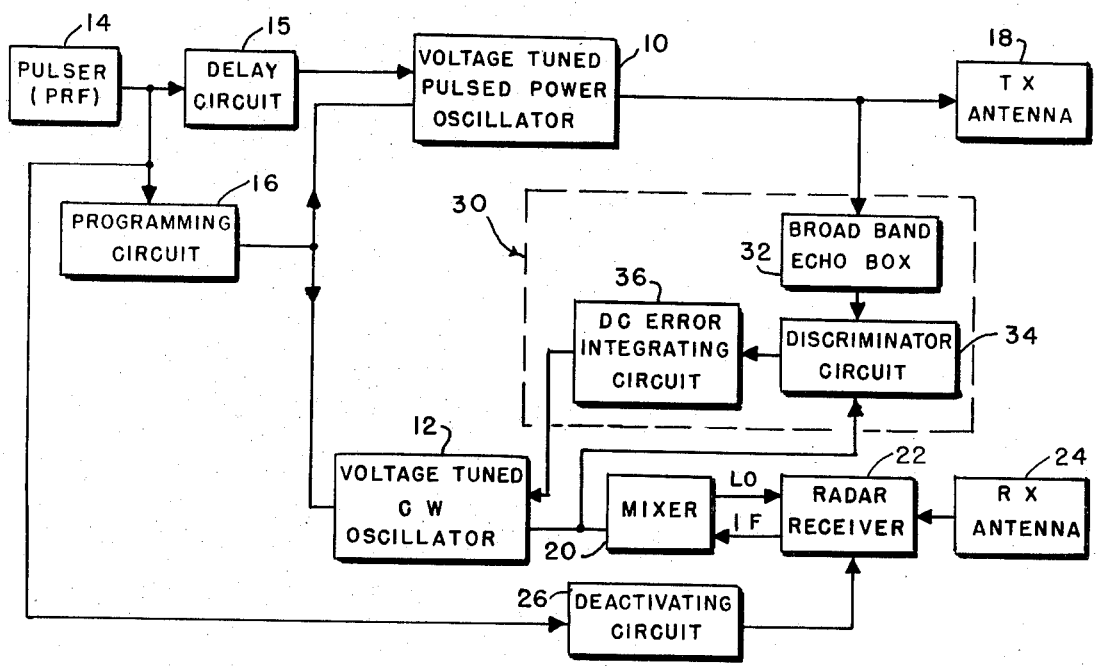
FIG. 1 is a block schematic diagram of the present invention.

Referring now to FIG. 1 of the drawing, 10 represents a voltage tunable pulsed power oscillator and 12 represents a voltage tunable low power continuous-wave oscillator adapted to operate over the same band of frequencies as that of oscillator 10. Both oscillators are preferably of the type known in the art as the Carcinotron which function as backward wave oscillators. Another type oscillator which may readily be used is that known as the backward wave magnetron oscillator which is described in my copending application, Ser. No. 512,349, now U.S. Pat. No. 2,817,040. Such oscillators are readily adapted to be voltage tuned over a very wide frequency range and may operate either at high power levels for pulsed operation or at low power levels for continuous-wave operation. Oscillator 10 is a high level energy transmitting source and is periodically pulsed into operation by the output from a pulse source 14 which is applied to oscillator 10 through a delay circuit 15, having a prescribed delay interval. Pulse source 14 may comprise any one of the well known circuits utilized in conventional radar pulse-echo systems to provide recurring pulses at the radar pulse repetition frequency. The pulse repetition frequency, of course, is selected in the usual manner in accordance with the range of distances to be covered by the radar system.

The frequency tuning voltage is applied simultaneously to both pulsed oscillator 10, hereinafter referred to as the transmitter, and continuous-wave oscillator 12, hereinafter referred to as the signal source, by means of a suitable programming circuit 16 which is triggered by the output of pulser 14 to generate a direct current voltage output varying in the form of steps as a function of time. One such circuit is illustrated on page 294 of Volume 19, "WAVE FORMS," of the MIT Radiation Laboratory Series. Programming circuit 16 is so constructed and arranged that for each recurring pulse applied thereto, the magnitude of the amplitude level of the direct-current tuning voltage applied to both transmitter 10 and signal source 12 will be instantaneously shifted, but the magnitude of the voltage level between any two successive recurring pulse signals will remain constant. By such an arrangement the output frequency of signal source 12 may be made to roughly track the frequency of pulsed transmitter 10, the output frequency energy of oscillator 12 being at one constant value for the period between any other pair of successive recurring pulses. Thus, for the duration between any two successive recurring pulses from pulser 14, the constant-wave frequency from signal source 12 will be substantially the same as the pulsed output frequency from transmitter 10 due to the first of said pulses. As shown, the pulse output frequency from transmitter 10 is fed to a conventional transmitting antenna 18, each transmitted pulse, of course, differing in frequency from the preceding one.

The output of low power signal source 12 is fed to a mixer 20 to which is also applied the intermediate frequency from a conventional superheterodyne radar receiver 22. By such an arrangement, the output from mixer 20 will provide either the sum or difference frequency of the constant signal source frequency and the receiver intermediate frequency for the duration of any constant frequency output from low power signal source 12. Either one of these frequencies may be applied to receiver 22 as the local oscillator frequency which will beat with the incoming frequency from receiving antenna 24 to generate the intermediate frequency which is detected in the receiver to provide the target echo. Thus as the transmitted pulse frequency and the signal source frequency are shifted, the local oscillator frequency in the receiver will be properly related to that of successive transmitted pulses. The output of pulser 14 is applied to receiver 22 through a suitable deactivating circuit 26 to synchronize the end of the reception interval with the beginning of each period of rapid frequency shift of transmitter 10, and to maintain the receiver inoperative for the duration of the transmitted pulses. The duration provided by delay circuit 15 thus represents the short period of time during which no pulse is transmitted or received and it is during this period that the system is frequency modulated by means of the output from programming circuit 16. If a random schedule is desired, the programming circuit may be controlled by a noise generator so that the transmitted frequency will vary from pulse to pulse in a completely unpredictable manner.

In order to properly maintain the correct signal source frequency between successive transmitted pulses, there is provided a servo loop 30 connected between the transmitter 10 and signal source 12. Servo loop 30 comprises a broad-band cavity resonator 32, preferably an echo box, a frequency discriminator circuit 34 and an error integrating circuit 36. Echo box 34 is energized by the pulsed output from transmitter 10 and rings or oscillates a period of time greater than the duration of the pulse transmitted frequency. The echo box in effect "remembers" the transmitted pulse frequency long enough to permit the servo loop to operate. The output of echo box 32 is fed to frequency discriminator circuit 34 into which is also fed part of the output frequency from voltage tunable signal source 12. The difference between these frequencies produces a direct-current error signal which feeds into integrating circuit 36, the output of which in turn is applied as a correction voltage to the signal source 12 so that the output frequency thereof is always brought to the frequency of the echo box after each output pulse from transmitter 10. Thus, the frequency of the voltage tunable signal source 12 is always corrected so that it is the same as the frequency of the preceding pulse from transmitter 10. Inasmuch as such discriminator and integrating circuits are well known in the art, no detailed description thereof is believed necessary.

Figure 2:
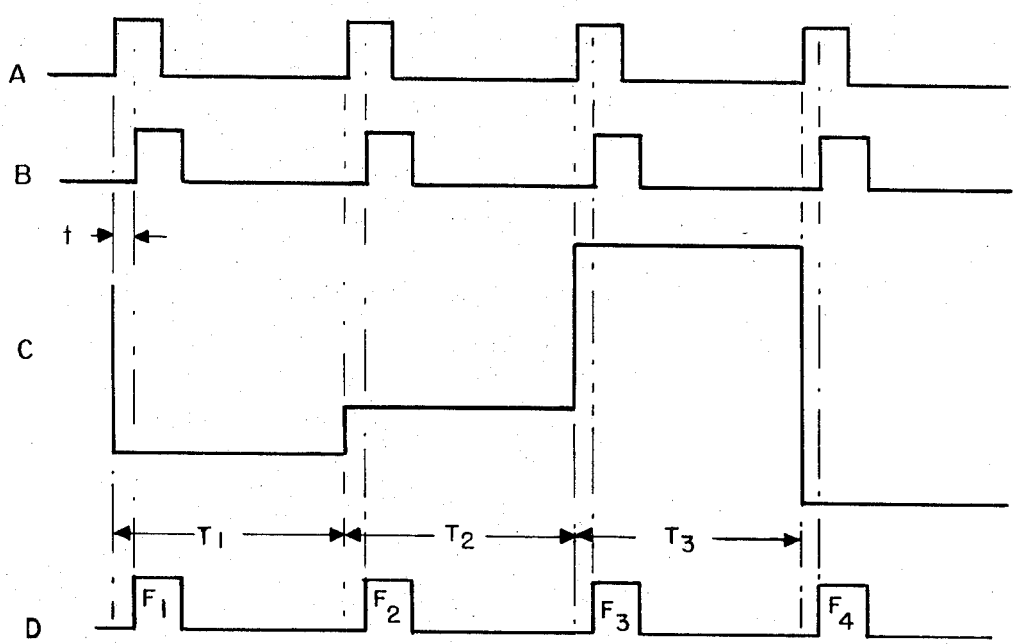
FIG. 2 is a group of explanatory curves.

To better understand the operation of the frequency diversity radar system shown in FIG. 1, reference is made to the curves shown in FIG. 2. The pulse shown at A represent the recurring periodic output pulse from pulser 14. These pulses are applied through delay circuit 15 as energizing pulses to transmitter 10 and are shown at B with the time of delay designated by the duration $t$. The step output voltage of programming circuit 16 is illustrated at C. As shown, the successive step voltages are shifted to discrete amplitude levels in synchronism with the leading edge of successive recurring pulses, with the magnitude of the amplitude of the step voltage remaining constant at one level between any two successive recurring pulses, but the amplitude voltage level changing from pulse to pulse. The step voltage from programming circuit 16 is simultaneously applied to both transmitter 10 and signal source 12 to provide voltage tuning in a manner such that both the transmitter and signal source frequency output are roughly tracked. Between any two amplitude levels, the output from signal source 12 is maintained constant at a frequency of the preceding pulse from the transmitter. This can more readily be appreciated from C and D of FIG. 2. In curve D the pulsed outputs from transmitter 10 have been labeled $F_1$, $F_2$, $F_3$ etc. For the duration between successive pulses such as $T_1$ for example, the output from signal source 12 will be maintained at $F_1$; for the duration $T_2$, the output from signal source 12 will be maintained at $F_2$, etc. Receiver 22 is deactivated for the period corresponding to the delay time $t$ plus the duration of the transmitted pulse. Thus the duration $t$ represents the time during which the system is frequency modulated and during this time no signal is either transmitted or received.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A frequency diversity radar system comprising a source of pulses of recurring frequency, a source of relatively high power radio-frequency energy periodically energized into oscillations by said recurring pulses and adapted to be voltage tuned over a relatively wide range of frequencies, an antenna responsive to the output of said pulsed oscillations, a source of relatively low power continuous-wave radio-frequency energy adapted to be voltage tuned over said range of frequencies, means responsive to said recurring pulses for voltage tuning said radio-frequency energy sources whereby the respective frequency-outputs therefrom an instantaneously and simultaneously shifted to successive discrete frequencies by successive recurring pulses, means coupled between said sources whereby the output frequency of said low power source is maintained constant for the duration between a pair of successive recurring pulses at the frequency of said high power source due to the first of said successive pair of pulses, a radar receiver adapted to receive echo signals and including local oscillator means for converting said received signals to a prescribed intermediate frequency, and means for heterodyning the successive frequency outputs from said low power source and said intermediate frequency whereby there is produced the local oscillator frequency to convert said received signals to said intermediate frequency.

2. The radar system in accordance with claim 1 wherein said radio-frequency energy sources are carcinotron type oscillators.

3. A frequency diversity radar system comprising a source of pulses of recurring frequency, a delay circuit having a prescribed delay interval, a source of relatively high power radio-frequency energy periodically energized into oscillations by said recurring pulses through said delay circuit, an antenna responsive to the output of said pulsed oscillations, a source of relatively low power continuous-wave radio-frequency energy, means responsive to said recurring pulses for voltage tuning said radio-frequency energy sources whereby the frequency outputs therefrom are instantaneously and simultaneously shifted to successive discrete frequencies by successive recurring pulses and the frequency output of said continuous-wave source is maintained substantially at the respective frequency outputs from said pulsed high power radio-frequency energy source for the duration between a pair of successive recurring pulses, a radar receiver adapted to receive echo signals and including local oscillator means for converting said received signals to a prescribed intermediate frequency, means for heterodyning the successive frequency outputs of said low power source and said intermediate frequency whereby there is produced the local oscillator frequency to convert said received signal to said intermediate frequency.

4. The system in accordance with claim 3 and further including a servo loop connected between said power sources comprising a broad-band echo box energized by the pulsed output of said high power source, a discriminator responsive to the combined frequency outputs of said high and low power sources for generating an error signal when said frequency outputs differ, and an integrating circuit responsive to said error signals.

5. The system in accordance with claim 4 and further including means for deactivating said receiver for just prior to the transmission of each pulse for a period corresponding to said delay interval plus the duration of said transmitted pulses.

6. A frequency diversity radar system comprising a source of pulses of recurring frequency, a source of relatively high power radio-frequency energy periodically energized by said recurring pulses and adapted to be voltage tuned over a relatively wide range of frequencies, an antenna responsive to the output of said pulsed oscillations, a source of relatively low power continuous-wave radio-frequency energy adapted to be voltage tuned over said range of frequencies, means responsive to said recurring pulses for voltage tuning said radio-frequency energy sources whereby the respective frequency outputs therefrom are instantaneously and simultaneously shifted to successive discrete frequencies by successive recurring pulses, a servo loop connected between said power sources for maintaining constant the output frequency of said low power source for the duration between a pair of successive recurring pulses at the frequency of said high power source due to the first of said successive pair of pulses, a radar receiver adapted to receive echo signals and including local oscillator means for converting said received signals to a prescribed intermediate frequency, and means for heterodyning successive frequency outputs from said low power source and said intermediate frequency whereby there is produced the local oscillator frequency to convert said received signals to said intermediate frequency.

7. The system in accordance with claim 6 wherein said servo loop comprises a broad-band echo box energized by the pulsed output of said high power source, a discriminator responsive to the combined frequency outputs of said high and low power sources for generating an error signal when said frequency outputs differ, and an integrating circuit responsive to said error signals and having its output connected to said low power source.

8. The system in accordance with claim 7 wherein said radio frequency energy sources are carcinotron type oscillators.

* * * * *